US006652162B1

(12) United States Patent
Presley

(10) Patent No.: US 6,652,162 B1
(45) Date of Patent: Nov. 25, 2003

(54) STAND-OFF FUSION-TERMINATED OPTICAL WAVEGUIDE INTERFACE

(75) Inventor: Harry Wayne Presley, Malabar, FL (US)

(73) Assignee: Harris ESS/CSD, Melbourne, FL (US)

( * ) Notice: Subject to any disclaimer, the term of this patent is extended or adjusted under 35 U.S.C. 154(b) by 0 days.

(21) Appl. No.: 09/216,751

(22) Filed: Dec. 17, 1998

(51) Int. Cl.$^7$ ............................................... G02B 6/255
(52) U.S. Cl. ........................................................ 385/96
(58) Field of Search ............................ 385/96, 33, 136, 385/137, 147, 14, 49, 35, 89, 93; 174/50; 156/272.8, 158

(56) References Cited

U.S. PATENT DOCUMENTS

| | | | |
|---|---|---|---|
| 5,199,087 A | * | 3/1993 | Frazier ........................ 385/14 |
| 5,339,380 A | * | 8/1994 | Wysocki et al. ............ 385/136 |
| 6,033,515 A | * | 3/2000 | Walters et al. ........... 156/272.8 |

* cited by examiner

Primary Examiner—Frank G. Font
Assistant Examiner—Michael P. Mooney
(74) Attorney, Agent, or Firm—Dennis L. Cook, Esq.; Fowler White Boggs Banker, P.A.

(57) ABSTRACT

The Stand-Off Fusion-terminated optical interface reduces optical reflections thereby increasing return losses that occur when an optical waveguide, including optical fibers, is interfaced to a bulk media of significantly differing refractive index. A small spacer material, or stand-off, is placed between the optical waveguide and the media. The stand-off is index-matched to the optical waveguide thereby eliminating reflections from this interface. The length of the stand-off is chosen so the reflections from the stand-off/media interface are weakly coupled back to the optical waveguide due to diffraction and attenuation losses within the stand-off. The optical waveguide is then fused to the stand-off by focusing a time variable laser beam at the junction of the optical waveguide and the stand-off.

6 Claims, 1 Drawing Sheet

STAND-OFF FUSION-TERMINATED OPTICAL WAVEGUIDE INTERFACE

FIELD OF THE INVENTION

The present invention is an improvement in the field of fiber optics and more specifically it is a generic technique for mechanically interfacing optical waveguides to bulk media. This invention reduces troublesome optical reflections that occur when an optical waveguide (including optical fibers) is interfaced to a bulk media. This invention can also be used in situations where an optical fiber must be interfaced to other media.

BACKGROUND OF THE INVENTION

Methods of interfacing fiber optic wave guides to bulk media are well known in the art but the typical methods of using epoxy, or simply end-butting the pieces together, has many complications associated with their use. It is obvious to anyone skilled in the art of fiber optics that it is important to terminate fibers to components with the most reliable and low loss approach. Epoxies remain the industry standard for joining optical fibers to components such as integrated optical circuits (couplers, modulators, etc.), amplifiers, switches, etc. However, epoxies can exhibit a number of undesirable characteristics: 1) relatively high thermal expansion coefficients can cause the fiber to move out of alignment with the component, 2) epoxies change their characteristics over time, including changing refractive index, elasticity, transmissivity, and, adhesion to the parts, 3) all epoxies have relatively low glass-transition temperatures (the temperature at which the epoxy starts to soften), and 4) air bubbles and contamination in the epoxy. Therefore, epoxies have performance and lifetime issues that can affect their suitability for certain applications. Thermal fusing has the potential to overcome the limitations exhibited by epoxies.

Another problem associated with prior art methods is optical reflections due to intervening materials and surface imperfections which cause scatter.

Reflections in fiber optic systems degrade performance. They can lead to temporal dispersion, background noise, losses, crosstalk, laser instabilities, and other problems. Reflections can arise from many sources such as switch and device interfaces, receiver termination, and other connections. Reflection requirements are becoming more and more demanding in such products as dense LAN's and test equipment. Return loss is one of the most important specifications in many optical devices. Traditional fixes are relatively complex and expensive. For example, a large refractive index discontinuity occurs between an optical fiber and a gradient index (GRIN) lens. This discontinuity can create a return loss of 30 dB. The standard industry method to fix this problem is to angle both the optical fiber and the GRIN lens. This can create a return loss of greater the 50 dB. Using the approach of this invention, with parts that are easy to fabricate and assemble, return losses of greater than 50 dB can be achieved.

SUMMARY OF THE INVENTION

The present invention has been made to solve the problems described above. It reduces optical reflections thereby increasing return losses that occur when an optical waveguide, including optical fiber, is interfaced to a bulk media. By thermally fusing the waveguide, or optical fiber, to the bulk media, or to a stand-off which is then attached to the bulk media, optical reflections at the interface are reduced to a minimum due to no intervening materials, elimination of surface imperfections that can cause scatter, and a softening of whatever refractive index discontinuity exists at the wave guide/bulk media or waveguide/stand-off interface due to a slight diffusion of waveguide materials into the stand-off.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
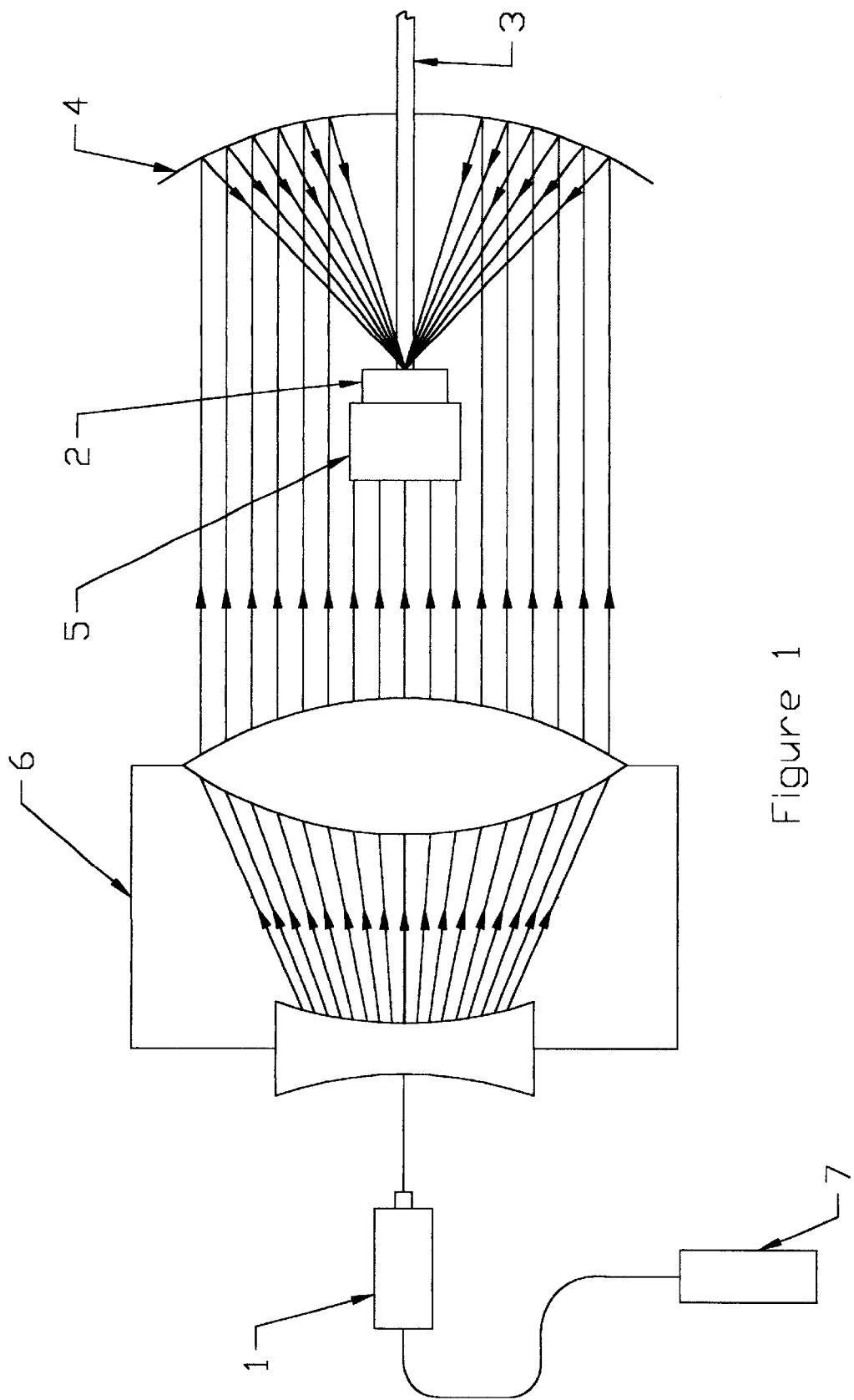
FIG. 1 is a block diagram showing the basic configuration of the method used to fuse the waveguide to the bulk media.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The stand-off fusion-terminated optical waveguide interface of the present invention can be used in many applications where a significant difference in refractive indexes of the connecting devices occurs and a large return loss is required. The main issue with implementing fusing is the compatibility of the fiber and component materials. Since virtually every fiber optic component consists of some type of glass or crystal, it is reasonable to expect that fusing could be implemented in a very wide variety of components given the right laser power, spot size, pulse duration, angle of incidence, etc.

The stand-off fusion-terminated optical waveguide interface reduces optical reflections thereby increasing return losses that occur when an optical waveguide, including optical fibers, is interfaced to a bulk media. By thermally fusing the waveguide, or optical fiber, to the bulk media, or to a stand-off which is then attached to the bulk media, optical reflections at the interface are reduced to a minimum due to no intervening materials, elimination of surface imperfections that can cause scatter, and a softening of whatever refractive index discontinuity exists at the waveguide/bulk media or waveguide/stand-off interface due to a slight diffusion of waveguide materials into the stand-off.

One critical element of using a stand-off to interface a optical fiber to an optical device is index matching of the stand-off material to the waveguide core, and subsequently finding an adhesive that bonds the two with a refractive index that is ideally the square root of the product of the two. The preferred material for the stand-off is the same base material from which the waveguide is formed. The adhesive, however, can be problematic in that only limited variations of refractive index are commercially available. The key feature of this method is that it overcomes this limitation by thermally fusing the waveguide to the stand-off material.

The stand-off fusion-terminated optical waveguide interface is shown in FIG. 1. The configuration shown provides a very controlled and symmetric delivery of heat to the desired junction. One critical element of reducing the reflections at the optical fiber (3)/stand-off (2) interface is to have the stand-off (2) closely index matched to the optical fiber (3). Therefore the preferred material for the stand-off (2) is the same base material from which the optical fiber (3) is formed. In the preferred embodiment a silica based optical fiber (3) is readily fused to a silica stand-off (2). The laser (1) is a CO2 laser chosen because of its 10.6 μm wavelength which is readily absorbed by silica-based materials. Those skilled in the art would recognize that other wavelength lasers would be used for other materials. A laser beam expanding device (6) is used to expand the beam so a majority of the beam can pass by the devices being fused. A concave spherical mirror (4) is then used to focus the laser beam on the junction of the optical fiber (3) and the stand-off (2). Although a spherical mirror is shown in this embodiment, an aspherical mirror could also be used to tailor the shape of the focused laser beam at the junction. A holder/shield devise (5) is used to hold the stand-off (2) against the optical fiber (3) and shield whatever optical devise is being connected to the optical fiber (3) while the laser (1) is activated.

For thermally fusing the optical fiber to the stand-off a controlled temperature profile process results in the most repeatable process and best overall performance. In the preferred embodiment the laser (1) is computer (7) controlled to optimize the heat applied to the stand-off (2)/fiber optic (3) junction. In the preferred embodiment shown in FIG. 1 a silica based fiber (3) is fused to a silica stand-off (2) with the following temperature timeline: Over a period of about 10 seconds the laser (1) ramps from its off state up to a temperature that is approximately 100° C. below the plastic temperature of silica and holds for approximately 5 seconds. Next the laser (1) then rapidly ramps, or jumps, to a temperature that is approximately 100° C. above the plastic temperature for approximately 1 second. Then the laser (1) rapidly ramps, or jumps, back to the temperature that is approximately 100° C. below the plastic temperature, and finally the laser (1) immediately begins a linear ramp down to its off state over a period of approximately 10 seconds. The exact timeline used could vary based on variations in the size of the optical fiber (3) and use of different materials for the optical fiber (3) and the stand-off (2).

Controlling the temperature in this manner has several advantages. It helps avoid thermal shock to the glass materials and relaxes (i.e. anneals) the fused junction which results in a stronger joint. It also results in a more complete adhesion of the optical fiber (3) to the stand-off (2). And, it encourages a small amount of diffusion of the optical fiber (3) core materials into the stand-off (2) which softens the refractive index discontinuity between the two thereby further reducing reflections at the junction.

Other techniques used by those skilled in the art may also be used to improve the process. To produce the strongest possible joint the process is best done in a nitrogen purged or vacuum chamber to avoid the inclusion of humidity or contaminants at the termination. Also, the fiber may be laser cleaved prior to the fusion process in order to produce a clean and slightly rounded fire-polish on the end of the fiber.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the dependent claims.

That which is claimed:

1. A method for reducing optical reflection at an optical waveguide to bulk media interface that reduces optical reflections and thereby increases return loses when an optical waveguide is interfaced to a bulk media of significantly differing refractive index comprising:

placing an optical interface between said optical waveguide and said bulk media, said optical interface comprising a stand-off, said stand-off having a larger cross-sectional area than said waveguide, said stand-off abutting against said optical waveguide, said stand-off abutting against said bulk media, said stand-off having an index closely matched to said optical waveguide, said stand-off having a minimum length sufficient to be capable of generating diffraction and attenuation losses within said stand-off to reduce the optical reflections coupled back to said waveguide from the interface between said stand-off and said bulk media; and thermally fusing said optical waveguide to said stand-off.

2. The method of claim 1 wherein:

a laser is used to thermally fuse said optical waveguide to said stand-off, said laser having a wavelength which is readily absorbed by silica; and an optical device is used to precisely control where the heat from said laser is applied to the junction between said optical waveguide and said stand-off.

3. The method of claim 2 wherein:

said laser is controlled by a controlling device to provide variations of said laser output.

4. The method of claim 3 wherein said controlling device is comprised of:

a computer capable of controlling said laser output on a timeline such as ramp up, hold, and ramp down.

5. The method of claim 2 wherein said optical device is comprised of:

a means for expanding the laser beam output of said laser; and a means for focusing said expanded laser beam on said junction.

6. A method for reducing optical reflection at an optical waveguide to bulk media interface that reduces optical reflections and thereby increases return loses when an optical waveguide is interfaced to a bulk media of significantly differing refractive index comprising:

placing an optical interface between said optical waveguide and said bulk media, said optical interface comprising a stand-off, said stand-off having a larger cross-sectional area than said waveguide, said stand-off abutting against said optical waveguide, said stand-off abutting against said bulk media, said stand-off having an index closely matched to said optical waveguide, said stand-off having a minimum length sufficient to be capable of generating diffraction and attenuation losses within said stand-off to reduce the optical reflections coupled back to said waveguide from the interface between said stand-off and said bulk media, thermally fusing said optical waveguide to said stand-off, said thermal fusing being done by a laser, said laser having a wavelength which is readily absorbed by silica, said laser is controlled by a controlling device to provide variations of said laser output, said controlling device being a computer capable of controlling said laser output on a timeline such as ramp up, hold, and ramp down, using an optical device to precisely control where the heat from said laser is applied to the junction between said optical waveguide and said stand-off; and said optical device being a means for expanding the laser beam output of said laser and a means for focusing said expanded laser beam on said junction.

\* \* \* \* \*